US011079462B2

(12) United States Patent
Ge et al.

(10) Patent No.: US 11,079,462 B2
(45) Date of Patent: Aug. 3, 2021

(54) FACILITATION OF EFFICIENT SIGNAL SOURCE LOCATION EMPLOYING A COARSE ALGORITHM AND HIGH-RESOLUTION COMPUTATION

(71) Applicant: International Business Machines Corporation, Armonk, NY (US)

(72) Inventors: Yi Ge, Beijing (CN); Jing Chang Huang, Shanghai (CN); Xiao Xing Liang, Beijing (CN); Zhao Tai Pan, Beijing (CN); Wen Meng Xiong, Beijing (CN); Yu Ling Zheng, Beijing (CN); Yu Chen Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 749 days.

(21) Appl. No.: 15/791,952

(22) Filed: Oct. 24, 2017

(65) Prior Publication Data

US 2019/0120926 A1    Apr. 25, 2019

(51) Int. Cl.
*G01S 5/02*    (2010.01)
*G01S 5/18*    (2006.01)
(Continued)

(52) U.S. Cl.
CPC .............. *G01S 5/0205* (2013.01); *G01S 3/74* (2013.01); *G01S 3/8006* (2013.01); *G01S 5/02* (2013.01); *G01S 5/18* (2013.01); *G01S 3/86* (2013.01)

(58) Field of Classification Search
CPC .... B64D 15/20; G01B 9/02043; G01N 15/02; G01S 3/74; G01S 3/8006; G01S 3/86; G01S 5/02; G01S 5/0205; G01S 5/18
See application file for complete search history.

(56) References Cited

U.S. PATENT DOCUMENTS 8,164,514 B1 *  4/2012  Yang ..................... G01S 5/0273
                                                            342/357.28
9,229,086 B2    1/2016  Shuang et al.
(Continued)

FOREIGN PATENT DOCUMENTS

CN          106093864 A     11/2016

OTHER PUBLICATIONS

Brooks, et al., "A deconvolution approach for the mapping of acoustic sources (DAMAS) determined from phased microphone arrays," Journal of Sound and Vibration 294 (2006), pp. 856-879.
Wang, et al., "A Low-Complexity Method for Two-Dimensional Direction-of-Arrival Estimation Using an L-Shaped Array," Sensors, 2017, 14 pages.
(Continued)

*Primary Examiner* — Manuel A Rivera Vargas
*Assistant Examiner* — Yaritza H Perez Bermudez
(74) *Attorney, Agent, or Firm* — Amin, Turocy & Watson, LLP

(57) ABSTRACT

Facilitation of determination of detailed location of a source signal is provided. In one embodiment, a device comprises a memory that stores computer executable components; and a processor that executes computer executable components stored in the memory. The computer executable components can comprise: a low-resolution computation logic component that implements a coarse algorithm and determines an approximate direction of arrival (DOA) of a source signal of an input signal, wherein the coarse algorithm uses both a coarse spatial grid and input data received from the input signal to determine the approximate DOA; and an error estimation logic component that estimates an estimation error of the coarse algorithm, and wherein the error estimation logic component uses the estimation error and the approximate DOA to determine a spatial interval range.

18 Claims, 9 Drawing Sheets

(51) Int. Cl.
*G01S 3/80* (2006.01)
*G01S 3/74* (2006.01)
*G01S 3/86* (2006.01)

(56) References Cited

U.S. PATENT DOCUMENTS

| | | | |
|---|---|---|---|
| 9,549,253 B2 | 1/2017 | Alexandridis et al. | |
| 2014/0316771 A1* | 10/2014 | Short | G01S 7/288 704/201 |
| 2014/0334265 A1 | 11/2014 | Yoo et al. | |
| 2015/0287422 A1* | 10/2015 | Short | G10L 13/02 704/205 |
| 2016/0071528 A9* | 3/2016 | Short | G10L 15/14 704/201 |

OTHER PUBLICATIONS

Irshad, et al., "High resolution matched-field source localization based on sparse-reconstruction," Ocean Acoustics (COA) 2016, 3 pages.
Macquarie University, "High-Resolution Detection of Direction of Arrival of a Transmitting Source," Last Accessed: Sep. 21, 2017, 2 pages.
Chen, et al., "Source Localization and Beamforming," IEEE Signal Processing Magazine, March 2002, 10 pages.
Pavlidi, et al., "Real-Time Multiple Sound Source Localization and Counting Using a Circular Microphone Array," IEEE Transactions on Audio, Speech, and Language Processing, vol. 21, No. 10, Oct. 2013, 14 pages.

* cited by examiner

FACILITATION OF EFFICIENT SIGNAL SOURCE LOCATION EMPLOYING A COARSE ALGORITHM AND HIGH-RESOLUTION COMPUTATION

BACKGROUND

This disclosure relates to signal source location determination and, more specifically, facilitation of efficient signal source location employing a coarse algorithm and high-resolution computation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus, and/or computer program products that facilitate locating the location of a source of a signal.

According to an embodiment, a device facilitating locating one or more sources of one or more signals is provided. The device can comprise: an error estimation logic component that estimates an estimation error of a coarse algorithm, wherein the error estimation logic component uses the estimation error and an approximate direction of arrival (DOA) of a source signal to determine a spatial interval range; and a high-resolution computation logic component that determines a detailed location of the source signal, wherein the detailed location is based on the spatial interval range, input data, and a refined spatial grid.

In another embodiment, a computer-implemented method facilitating locating one or more sources of one or more signals is provided. The computer-implemented method can comprise: implementing, by a system operatively coupled to a processor, a coarse algorithm; estimating, by a system operatively coupled to a processor, an estimation error of a coarse algorithm, wherein the estimation error and an approximate direction of arrival (DOA) are employed to determine a spatial interval range; and determining, by the system, a detailed location of a source signal, and wherein the detailed location is based on the spatial interval range, input data, and a refined spatial grid.

In another embodiment, a computer program product for determining a location of a signal source can be provided. The computer program product comprises a computer readable storage medium having program instructions embodied therewith. The program instructions can be executable by a processor to: estimate, by the processor, estimation error of a coarse algorithm, wherein the estimation error and an approximate direction of arrival (DOA) are employed to determine a spatial interval range; and determine, by the processor a detailed location of a source signal, wherein the detailed location is based on the spatial interval range, input data, and a refined spatial grid.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
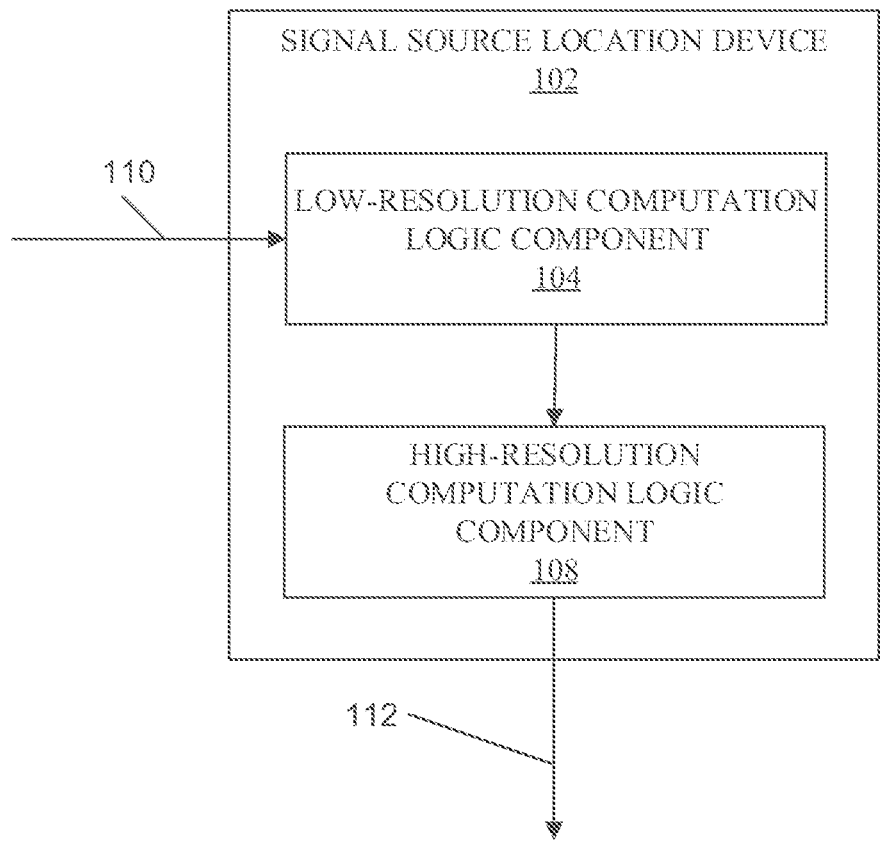
FIG. 1 illustrates a block diagram of an example, non-limiting device that detects the location of a signal source in accordance with one or more example embodiments of the invention described herein.

FIG. 1 illustrates a block diagram of an example, non-limiting embodiment of a signal source location device 102 (signal source location device) that facilitates determining the location of a signal source. The signal source can be noise, an electromagnetic radiation source, or another type of signal. In various embodiments, the signal source location device 102 can include a low-resolution computation logic component 104 and a high-resolution computation logic component 108. An input line 110 can contain one or more communication lines that bring inputs from microphone sensors or other suitable signal detection components into the signal source location device 102 (in some configurations via input ports) and an output line 112 that can contain one or more individual output lines bring signal(s) indicating a location of a signal source. The input line 110 and the output line 112 can be single lines or multiple lines/busses and can be part of the signal source location device 102 or can be communicatively removably attached to the signal source location device 102 as well as being removably detached from the signal source location device 102.

"Processor", "Logic", and "Logic Component" as used herein, includes but is not limited to hardware, firmware, software and/or combinations of each to perform a function (s) or an action(s), and/or to cause a function or action from another logic, method, and/or system. For example, based on a desired application or need, logic and/or processor can be or include a software-controlled microprocessor, discrete logic, an application specific integrated circuit (ASIC), a programmed logic device, a memory device containing instructions or the like. Logic, logic component, and/or processor can include one or more gates, combinations of gates, or other circuit components. Logic, logic component, and/or processor can also be fully embodied as software. Where multiple logics and/or processors are described, it can be possible to incorporate the multiple logics and/or processors into one physical logic (or processor or logic component). Similarly, where a single logic, logic component, and/or processor is described, it can be possible to distribute that single logic, logic component, and/or processor between multiple physical logics, logic components, and/or processors.

Returning to FIG. 1, the low-resolution computation logic component 104 can determine an approximate location of a signal source relative to one or more spatial intervals of a signal source or sources. As discussed above, the signal source location device 102 can receive signals from one or more sensors, microphones and/or other suitable devices that collectively search over a large area from 0 to 360 degrees outward from the signal source location device 102. Alternatively, if signals are only expected in two or more regions, then the signal source location device 102 can receive signals from one or more sensors focused on (associated with) those two or more regions. For example, a signal can only be expected between 90 to 180 degrees or 270 and 360 degrees from the signal source location device 102, then data associated with those two regions can be received by the signal source location device 102 and/or used for analysis by the low-resolution computation logic component 104. This is illustrated in more detail in FIGS. 2A-B.

Figure 2:
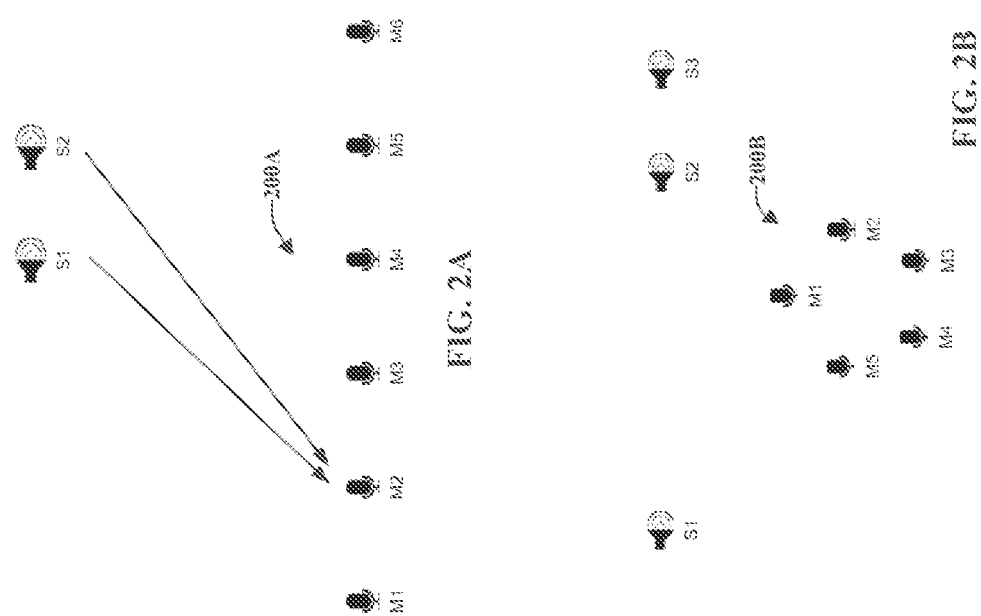
FIGS. 2A-B illustrate example locations of possible source signals and example geometric arrays of microphones used to sense the source signals in accordance with one or more embodiments described herein.

FIGS. 2A-B illustrate two example arrays of sensors. FIG. 2A illustrates a linear arrangement of sensors/microphones M1-6 receiving signals from two sources S1-2. In this example illustration, signal S1 arrives at microphones M1-6 with a larger angle with respect to the linear arrangement of microphones M1-6 than signal S2. In some embodiments, this data can be input to the low-resolution computation logic component 104 and the high-resolution computation logic component 108 as discussed below.

Returning to FIG. 1, the low-resolution computation logic component 104 can use one or more of: a source localization technique, spectrum analysis, Fourier transform analysis (in the Fourier frequency domain) of data extracted from the input data on the input line 110, and/or any other suitable techniques as understood by those of ordinary skill in the art to produce an output to the high-resolution computation logic component 108 indicating possible locations of signals of interest and can also include an estimation of their magnitude.

The high-resolution computation logic component 108, can in some embodiments, receive the output from the low-resolution computation logic component 104 and then use a high-computation high-resolution technique to determine a better, more detailed location of the signal source. Those of ordinary skill will also appreciate that in some embodiments a source localization technique, spectrum analysis, Fourier transform analysis of spectra data, and/or any other suitable technique can be implemented by the high-resolution computation logic component 108 to produce an output that can be communicated on an output line 112 communicatively coupled with the signal source location device 102. This output can indicate a detailed location of the origination of the signal(s) of interest discovered by the low-resolution computation logic component 104 and some embodiments can include magnitudes or other information associated with those signals such as a direction of arrival (DOA) of the signal source and/or a spatial coordinate of the signal source. The DOA can be found by computing the spatial spectra for possible angles (the spatial spectra can be a mathematical function of angle) and the directions of arrival are angles where the spatial spectral are the highest.

In one example, finding the DOA during the low-resolution step can be difficult because the location of the source is completely unknown. As a result, we need to compute the spatial spectra for the whole spatial space, i.e. [−90 degrees, 90 degrees], for example. When this occurs, a large grid can be chosen to reduce the computation burden. For example, a grid of 8 degrees can be chosen and spatial spectra at −90, −82, −74, −66, . . . , 86 degrees. These angles can be chosen with largest spatial spectra as the approximate DOA.

In this same example, after determining the low-resolution direction of the source and the corresponding error estimation, the location of the source is approximately known where the sound sources are, for example, within the range of [24,38] degrees. Now, the high-resolution approach can be applied in this reduced angle range. Because this range is much smaller, we can take a much smaller grid, e.g. 1 degree and use the high-resolution method to compute the spatial spectra at angles 24, 25, 26, . . . , 38 degrees. The DOA of sound sources are angles where the spatial spectra are the highest.

In some other configurations and embodiments, the low-resolution computation logic component 104 can determine the approximate location of the signal source using a beam-forming algorithm. In some embodiments, the low and/or high-resolution computation logic components determine, at least in part, the approximate location or the detailed location, respectively, of the signal source using a de-convolution approach for a mapping of acoustic sources (DAMAS) beam formation algorithm and/or a CLEAN beam formation algorithm (or CLEAN algorithm), or another algorithm as understood by those of ordinary skill in the art. As understood, the term CLEAN represents a family of algorithms including, but not limited to, Hogbom CLEAN algorithm, Clark CLEAN, MX CLEAN, etc.

In at least one embodiment, the signal source location device 102 can analyze signals where the signal source can be an unwanted noise. For example, a car manufacture can use the signal source location device 102 to locate unwanted noises in an automobile or another vehicle. Others looking for unwanted noise can use the signal source location device 102 to find the locations of other unwanted noises in other devices, systems, and the like.

In other embodiments, to improve an estimation of a signal's location, the low-resolution computation logic component 104 can assign θ as a true direction of arrival (DOA) and $\hat{\theta}$ as an estimated DOA, where:

$$\Delta\theta = \hat{\theta} - \theta = \frac{-\text{Re}(\dot{\alpha}^H(\theta)\hat{R}a(\theta))}{\text{Re}(\ddot{\alpha}^H(\theta)\hat{R}a(\theta) + \dot{\alpha}^H(\theta)\hat{R}\dot{a}(\theta))}.$$ (Equation 1)

In some configurations, the high-resolution computation logic component 108 can make similar assignments and perform similar actions based on the assignments. In the above equation (1), α(θ) denotes a steering vector and, $\hat{R}$, an empirical covariance matrix that the low-resolution computation logic component 104 can determine from sensor measurements, $\dot{\alpha}(\theta)$ and $\ddot{\alpha}(\theta)$. One or more sensor measurements denote first-order and second-order derivatives of α(θ) and $\alpha^H(\theta)$ that represent a conjugate pair of α(θ) and Re( ) associated with a real part of a complex number. Thus, the estimated DOA approximates θ and an improved θ DOA can be included in an interval [$\hat{\theta}$−αΔθ, $\hat{\theta}$+αΔθ] when the low-resolution computation logic component 104 selects a properly sized coefficient, α. In practice, as the true DOA θ is not previously known, when computing Δθ using the rightmost expression of the Equation 1, we can use the estimated DOA $\hat{\theta}$ to replace θ. In yet other embodiments, a computational work performed by the low-resolution computation logic component 104 can be combined with a computation of work performed by the high-resolution computation logic component 108 of the signal source location device 102 to determine the specific location of the signal source can be a first computational value. The first computational value can be lower than a second computational value of work of the high-resolution computation logic component solely determining a similar specific location of the signal source without assistance from the low-resolution computation logic component 104. Thus, the processing power, or amount of work performed discrete components, and/or the number of equivalent software instructions to compute the detailed location by the low/high computation logic component together can be less than the work required to compute the detailed location solely by the high-resolution computation logic component 108 acting alone.

In some configurations, the high-resolution computation logic component 108 can receive inputs from the input line 110 from the low-resolution computation logic component 104, as illustrated. In other configurations, the high-resolution computation logic component 108 can have a direct connection to the input line 110.

In still other embodiments, the low-resolution computation logic component 104 can assign a value to an estimated DOA based on the input data. This assignment can be made in any desired manner as understood by those of ordinary skill in this art. The high-resolution computation logic component 108 can determine the detailed location based on the assigned value. The device can be implemented in a silicon chip, a printed circuit board (PCB), and/or a programmable logic device.

Figure 3:
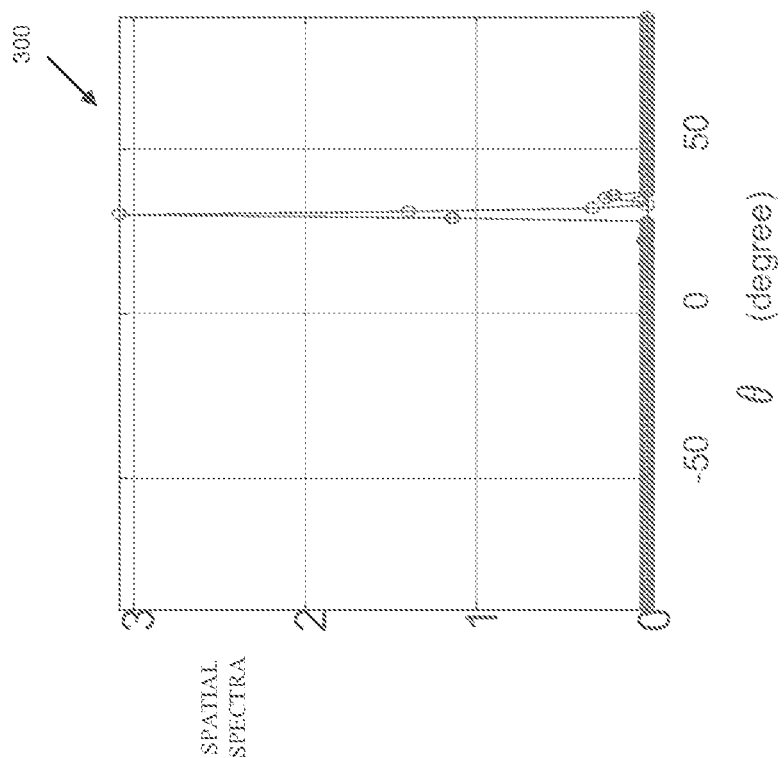
FIG. 3 illustrates an example graph of spectral data output from a device that can determine the location of one or more signal sources using a high-resolution analysis on data input to the device.

FIG. 3 illustrates an example graph 300 of spatial spectral data output from a single step high-resolution device (or a similar software simulation) that processes data covering a large geographical area where the data can be associated with one or more possible signal sources. This figure is for illustrational purposes and does not necessarily represent the spectral data output from any of the embodiments of the invention discussed herein. The experimental device that generated the graph of FIG. 3 operates on that large amount of data of the geographical area in one large processing and analysis operation and then can determine the presence of one or more signal sources based on the single processing/analysis of this data. In a bit more detail, the graph 300 represents the output from the device and shows the location of signal source(s) discovered by the device. The device can be connected to one or more sensors/receivers that sense data associated with one or more signal sources. For example, the receivers can be microphones or other devices that detect audio signals, electromagnetic signals, and/or other signals as understood by those of ordinary skill in the art. After this data is collected at the microphones/receivers and/or other suitable device, the data can be processed using a detailed high-resolution analysis on the data. As seen in this example graph 300, the data can be collected and analyzed between −90 and 90 degrees with respect to the microphones collecting that data. As seen in the graph 300, this resulting in finding a large signal to the left of a smaller signal between the 27 and 35 degree area with respect to an angle the signal travels toward the microphones from its sources. Finding these signals using an approach of processing all collected data once, in one large data calculation stage, using a detailed high-resolution analysis was performed and resulted in a computational (work effort) time of 15 seconds.

Figure 4A:
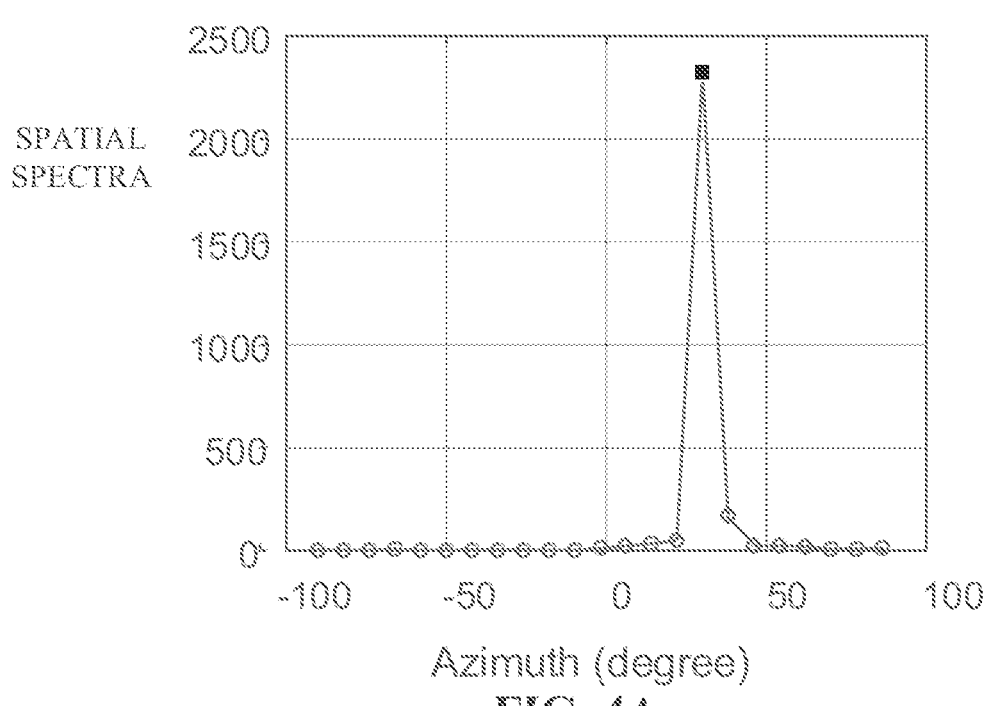
FIG. 4A illustrates an example graph of spectral data after a device that can determine the location of one or more signal sources employs a low-resolution analysis on data input to the device in accordance with one or more embodiments described herein.
Figure 4B:
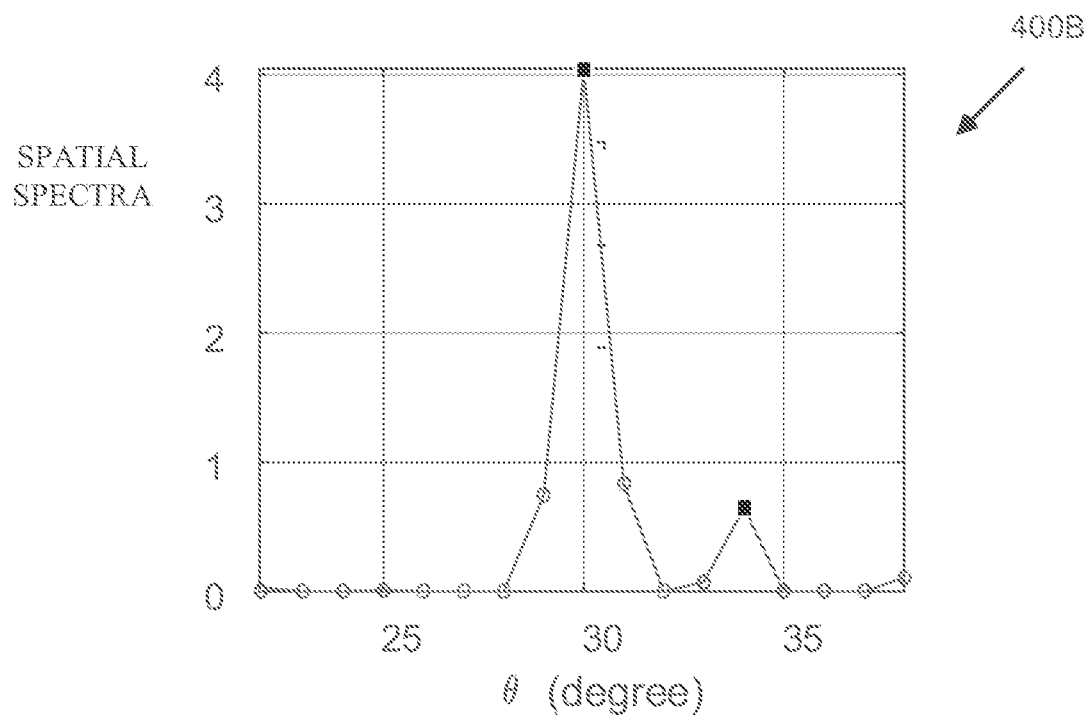
FIG. 4B illustrates an example graph of spectral data after a device applies a high-resolution analysis to a reduced angle range associated with a possible source signal detected from the low-resolution analysis illustrated in FIG. 4A in accordance with one or more embodiments described herein.

FIGS. 4A-B illustrate example graph 400A and graph 400B of a spectral data intermediate signal (FIG. 4A) and a final spectral signal (FIG. 4B) output from a device that can determine the presence of one or more signal sources. These figures represent example data that can be generated by various embodiments of the present invention described herein. The device (or simulation) generating the FIGS. 4A-B can be connected to one or more receivers that sense data associated with one or more signal sources. Unlike the device generating the output of FIG. 3, the device generating the outputs of FIGS. 4A-B can use (similar to the signal source location device 102 of FIG. 1) a two-step process to determine the location of signal sources. First, the data can be processed using a low-resolution analysis over all, or a large portion, of the spatial space to find where signal(s) of interest can be located (spatial spectra graph of FIG. 4A). Second, the signal(s) of interest can provide a smaller area of spatial space that can be next processed with high-resolution analysis that produces the graph 400B (greater resolution spectra graph) enhancing the spectra graph shown in graph 400A of FIG. 4A.

In more detail, FIG. 4A illustrates, a search of the spatial space between −90 degrees and 90 degrees with respect to microphones or other data collecting input data that can be signal data and/or another type of broadcast data. Graph 400A illustrates one embodiment of a low-resolution analysis of possible signal sources. This graph 400A indicates that there are signal(s) of interest between the 20-degree and 40-degree area. Knowing this information, some embodiments can now perform a high-resolution, more intensive and detailed, calculation of just data corresponding to the 20 and 40-degree area. This calculation can be performed using, a source localization technique, spectrum analysis, Fourier transform analysis of spectra data extracted from the input data between 20 and 40 degrees area (found by the low-resolution analysis), and/or any suitable technique as understood by those of ordinary skill in the art. The high-resolution results can be operated on to generate graph 400B, which illustrates a maximum signal at about 29 degrees and a smaller signal at about 33.6 degrees.

Finding signal sources using this two-step low/high resolution approach can be more efficient and faster than calculating with a single-step, with solely a high-resolution single calculation, to find a signal. This is because calculating where a signal source is located consistently uses a lot of data that contains no signal so that processing a majority of the data not containing a signal can be of little use. In contrast to the previous single high-resolution approach, the two-step approach used to find signal sources of FIGS. 4A-B first processes signal data over a wide geographical area using a low-resolution analysis to initially discover the rough location(s) of signal(s) of possible interest. Second, the data corresponding to signal source(s) of interest discovered in the prior low-resolution analysis can be then processed with the detailed high-resolution source localization techniques or in other suitable ways as understood by those of ordinary skill in the art. Simulation data of this two-step process shows that the computational cost (work effort) of this approach is about 1 second, which is about 15 times faster than the 15 seconds needed to analyze all the spatial spectra solely using a high-resolution analysis.

Figure 5:
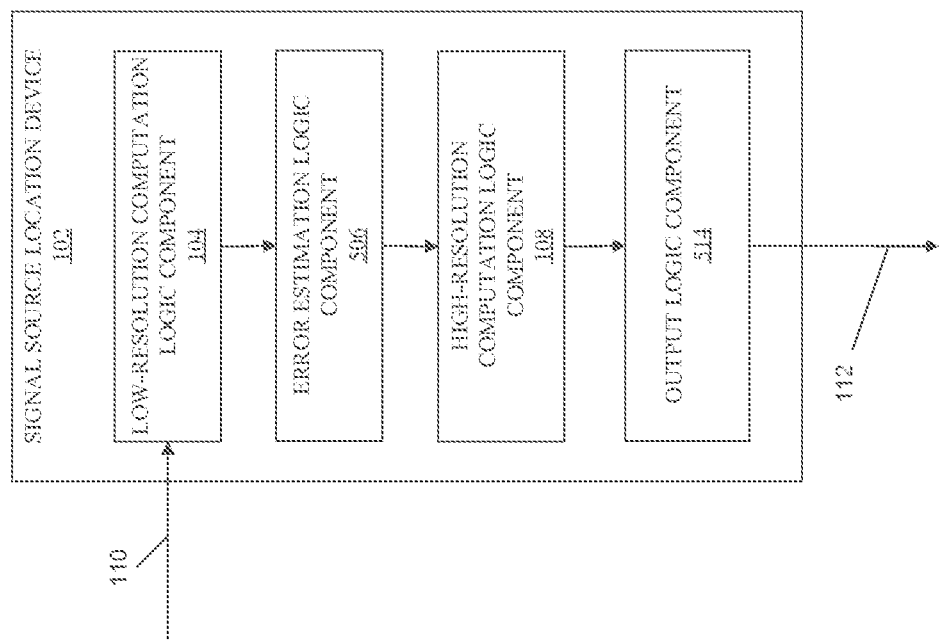
FIG. 5 illustrates yet another block diagram of an example, non-limiting source location device that detects the location of a signal source in accordance with one or more embodiments described herein.

FIG. 5. illustrates another block diagram of an example, non-limiting embodiment of a signal source location device 102 that facilitates determining the location of a signal source similar to the signal source location device 102 of FIG. 1). As before, signal source can be noise, and electromagnetic radiation source, or another type of signal and can be any distance from the signal source location device 102. The input line 110, the output line 112, the low-resolution computation logic component 104, and the high-resolution computation logic component 108 are similar to those of FIG. 1. Repetitive description of these and other like elements employed in this and other embodiments described herein are omitted for sake of brevity.

In addition to the components of the signal source location device 102 of FIG. 1, the signal source location device 102 has an error estimation logic component 506 and an output logic component 514. In some embodiments, the error estimation logic component 506 can implement an estimation error of the approximate location of the signal that was determined by the low-resolution computation logic component 104. The estimation error can be determined by the error estimation logic component 506 with respect to a possible actual location of the signal source. In other configurations, the estimation error can be a Taylor series approximation that can be a first order Taylor series approximation. Those of ordinary skill in the art understand that an estimation error can be determined in other ways.

In other embodiments, the output logic component 514 outputs the detailed location of the signal source in a format that allows the signal source to be geographically located. For example, this format of output can allow for the location of the signal source to be illustrated on a 2-dimension image on an electronic screen for easy of viewing by a person. It is conceivable that the format of the output can provide for the signals being displayed in 3-dimensions or a 2-dimensional representation of 3-dimensions on an optical display.

In yet some other embodiments, the output logic component 514 can output the detailed location in a format to facilitate for the generator of the signal source to be at least partially identified. For example, the output logic component 514 can output the detailed location in a format that includes data about how the signal was shaped, its frequency, how it was modulated, the signal strength and/or its duration and other desired signal characteristics can be output as desired. This data can be gathered while the input data can be processed in the low and high-resolution computation logic component.

Figure 6:
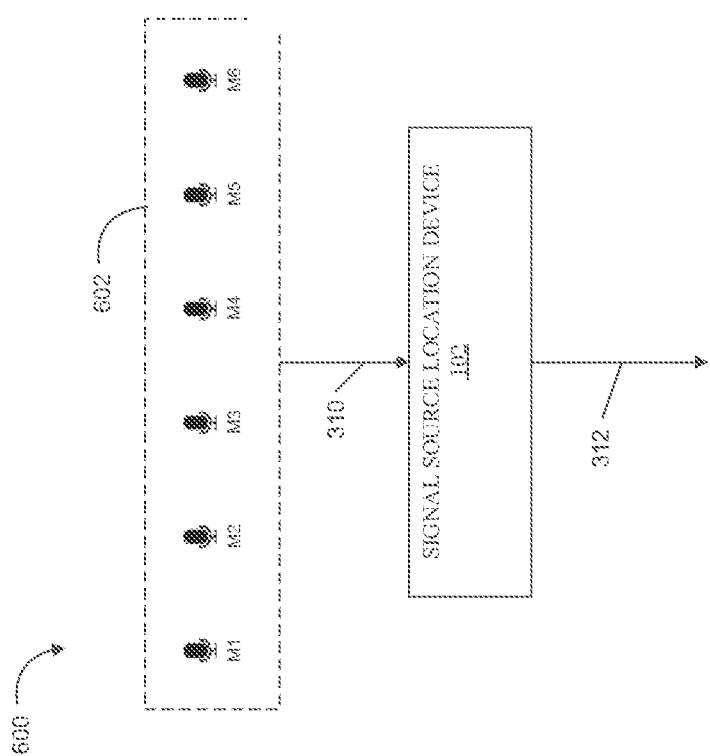
FIG. 6 illustrates a schematic of an example embodiment of a non-limiting system that detects the location of a signal source in accordance with one or more embodiments described herein.

In various embodiments, the device can be part of a system that locates sources of various signals or noise. FIG. 6 illustrates an example, non-limiting, embodiment of an example system 600 for locating a source. In the embodiment shown in FIG. 6, the system 600 includes the signal source location device 102 of FIG. 1, and additionally, a sensor array 602 formed with sensors S1-6, an optional display and an optional memory. The memory can be part of a memory device, a computer, a server, and the like. In other example embodiments, the signal source location device 102, can have internal components similar to the signal source location device 102 of FIG. 5. As before, repetitive description of like elements employed in other embodiments described herein is omitted for brevity.

As illustrated in FIG. 6, the sensor array 602 can be communicatively coupled bi-directionally with the signal source location device 102 with a wireless communication link and/or a physical link to allow the signal source location device 102 to receive inputs from the sensor array 602 relating to signals received from sources remote from the system 600. The links can be bidirectional to allow for the signal source location device 102 to configure sensors M1-6 within the sensor array 602 to detect desired signal characteristics. The display and the memory can be similarly both communicatively coupled bi-directionally with the signal source location device 102 with a wireless communication link and/or a physical link to communication with the signal source location device 102. These links allow the display to display graphical data indicating a location of a discovered source, for example. The memory provides the system 600 with the capability to store input signal data from sensors M1-6 as well as intermediate/incomplete data results, as well as complete output results for later review and/or further review by the signal source location device 102 or other devices or systems.

Figure 7:
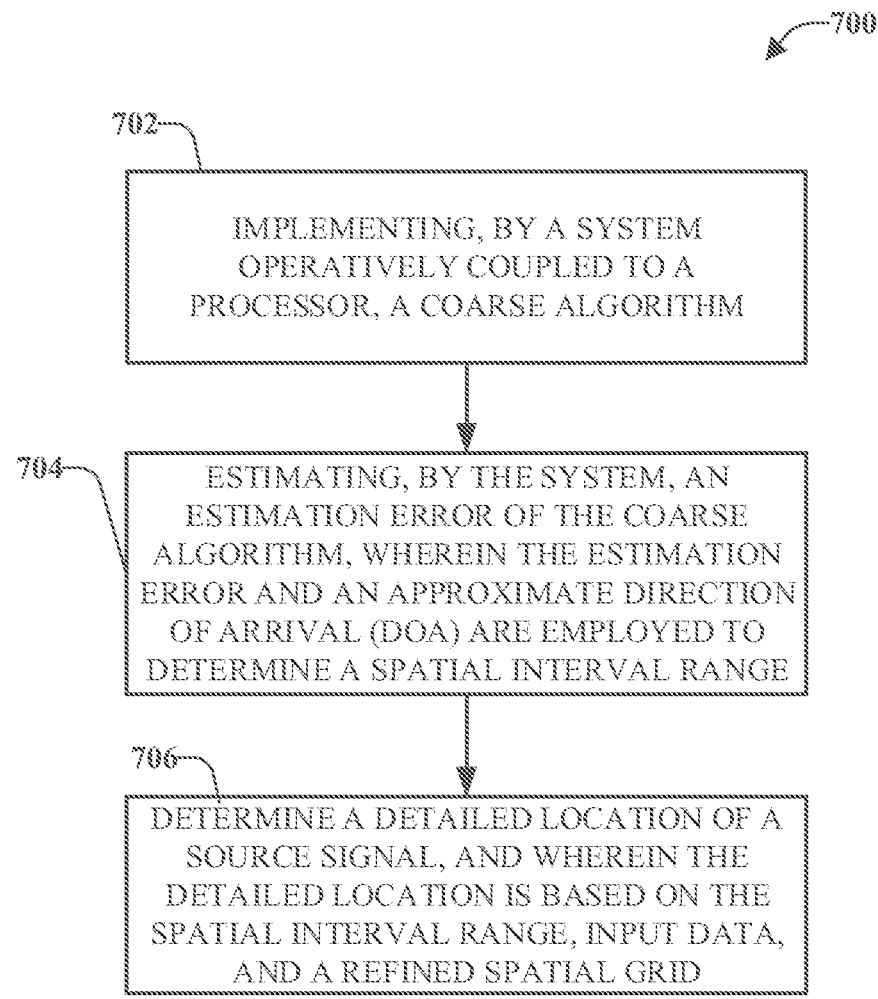
FIG. 7 illustrates a flow diagram of an example, non-limiting computer-implemented method that facilitates discovering sources of signals in accordance with one or more embodiments described herein.

FIG. 7 illustrates a flow diagram of an example, non-limiting embodiment of a computer-implemented method 700 that can determine one or more source locations from which one or more signals can be generated. Repetitive description of like elements employed in other embodiments described herein is omitted for sake of brevity.

In one embodiment, the computer-implemented method 700 begins, at 702, by implementing, by a system operatively coupled to a processor (e.g., by the low-resolution computation logic component 104), a coarse algorithm. The coarse algorithm can determine (e.g., the low-resolution computation logic component 104) an approximate direction of arrival (DOA) of a source signal of an input signal. The coarse algorithm can use both a coarse spatial grid and input data received from the input signal to determine the approximate DOA in some embodiments.

The computer-implemented method 700 at 704, can estimate (e.g., by the error estimation logic component 506), at 704, an estimation error of the coarse algorithm, wherein the estimation error and an approximate direction of arrival (DOA) are employed to determine a spatial interval range.

The computer-implemented method 700 at 706, can determine (e.g., by the high-resolution computation logic component 108) a detailed location of a source signal, and wherein the detailed location is based on the spatial interval range, input data, and a refined spatial grid. This essentially high-computation high-resolution source localization technique can use more spatial intervals (a smaller spatial grid spanning just the spatial interval range) associated with the signal source than used in the earlier low-resolution source localization technique. This additional resolution provides for a more accurate detailed location value than the approximate location value found earlier.

In other embodiments and configurations, the computer-implemented method 700 can include other actions and features. For example, in one or more embodiments, the low-computation low-resolution source localization technique (e.g., implemented by the low-resolution computation logic component 104) can use beam forming to, at least in part, determine the approximate location of the signal source. It is conceivable that in some embodiments, the high-resolution computation logic component 108 can be iterative algorithms when determining the detailed location of a signal source. For example, the iterative algorithm can be an approach such as the de-convolution approach for a mapping of acoustic sources (DAMAS) algorithm and/or a CLEAN algorithm.

Figure 8:
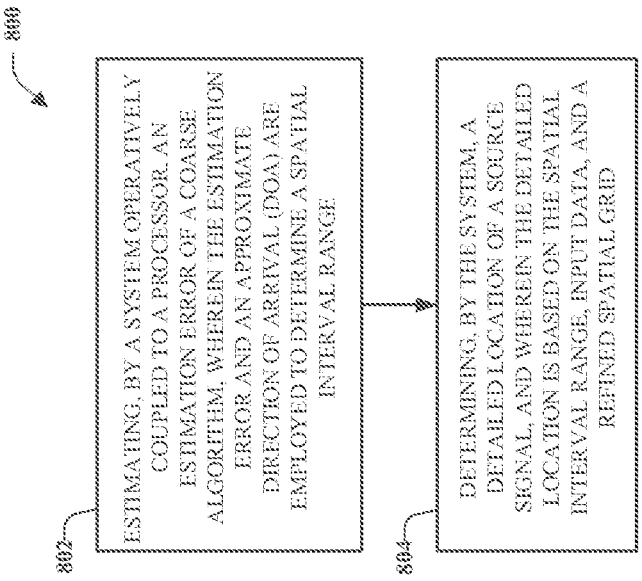
FIG. 8 illustrates a flow diagram of an example, non-limiting, computer-implemented method that facilitates discovering sources of signals in accordance with one or more embodiments described herein.

FIG. 8 illustrates a flow diagram of an example, non-limiting computer-implemented method that can determine a location of at least one source from which signals can be transmitted. At 802, method 800 can comprise estimating, by a system (e.g., system 100) operatively coupled to a processor, an estimation error of a coarse algorithm, wherein the estimation error and an approximate direction of arrival (DOA) are employed to determine a spatial interval range. At 804, method 800 can comprise determining, by the system (e.g., system 100), a detailed location of a source signal, and wherein the detailed location is based on the spatial interval range, input data, and a refined spatial grid.

Although not shown, an example, non-limiting computer program product can determine a location of at least one source from which signals can be transmitted. The computer program product includes a processor and a computer readable storage medium having program instructions embodied therewith. In one embodiment, the computer program product can begin by executing instructions with the processor, to implement a coarse algorithm that can determine an approximate direction of arrival (DOA) of a source signal of an input signal. The coarse algorithm can use both a coarse spatial grid and input data received from the input signal to determine the approximate DOA. The processor can calculate an estimation error of the approximate location of the signal source. This can be calculated in any suitable way as discussed above and is not repeated here.

The processor can use the estimation error to perform, as instructed by the processor, a high-computation high-resolution source localization technique to determine a detailed location of the signal source. As mentioned earlier, the high-computation high-resolution source localization technique can use more spatial intervals (per unit area) associated with the signal source than used by the low-computation low-resolution source localization technique. For example, the low-computation low-resolution source localization technique can use a grid size of eight units and the high-computation high-resolution source localization technique can use a smaller grid size of 1 unit.

Figure 9:
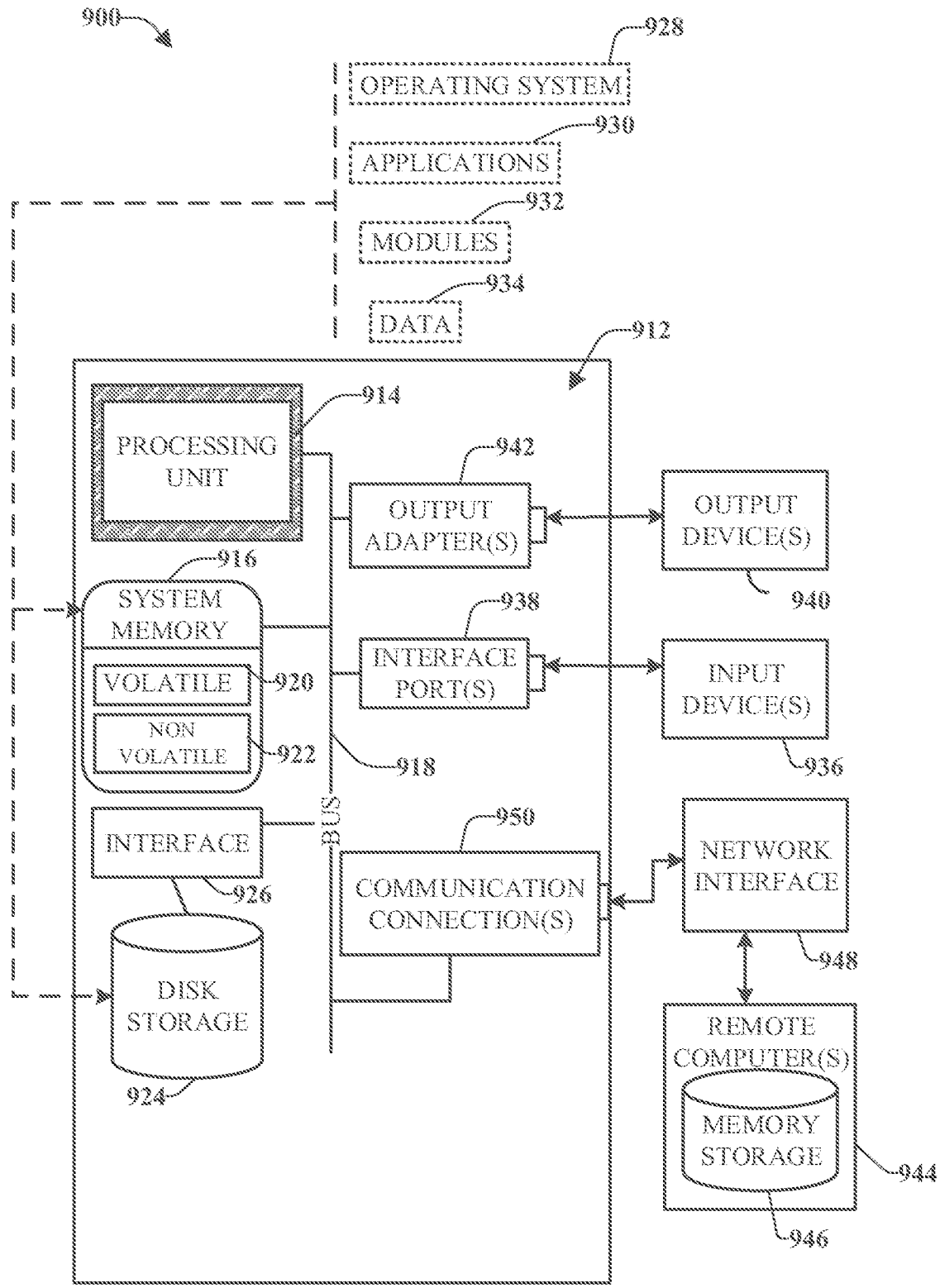
FIG. 9 illustrates a block diagram of an example, non-limiting operating environment in which one or more of the example embodiments described herein can be facilitated.

In order to provide a context for the various aspects of the disclosed subject matter, FIG. 9 as well as the following discussion are intended to provide a general description of a suitable environment in which the various aspects of the disclosed subject matter can be implemented. FIG. 9 illustrates a block diagram of an example, non-limiting operating environment in which one or more embodiments described herein can be facilitated. Repetitive description of like elements employed in other embodiments described herein is omitted for sake of brevity.

With reference to FIG. 9, a suitable operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 916 can also include volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used, such as interface 926. FIG. 9 also depicts software that acts as an intermediary between users and the basic computer resources described in the suitable operating environment 900. Such software can also include, for example, an operating system 928. Operating system 928, which can be stored on disk storage 924, acts to control and allocate resources of the computer 912.

System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 942 is provided to illustrate that there are some output devices like monitors, speakers, and printers, among other output devices, which require special adapters. One or more output adapter 942 can include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor based appliance, a peer device or other common network node and the like, and typically can also include many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

The present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic component (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device, comprising:
a processor, operably coupled to the memory, wherein the processor:
processes input data from one or more sensors communicatively coupled to the device;
estimates an estimation error of a coarse algorithm, wherein the coarse algorithm comprises a beamforming algorithm that determines an approximate location of a source signal, and uses the estimation error and an approximate direction of arrival (DOA) of the source signal to determine a spatial interval range, and wherein the estimation error is a function of a steering vector and a covariance matrix from measurements from the one or more sensors and associated with the signal source; and
employs the spatial interval range determined, the input data and a refined spatial grid to determine a detailed location of the source signal based on a de-convolution approach for a mapping of an acoustic sources algorithm, wherein the coarse algorithm is performed first, the estimation of estimation error is performed after the coarse algorithm, wherein the determination of the detailed location of the source signal is performed after the estimation of the estimation error, and wherein a processing power of the device computing the detailed location based on the estimation and the determination of the detailed location is less than a processing power of a second device computing the detailed location solely based on the determination of the detailed location of the source signal based on the de-convolution approach.

2. The device of claim 1, wherein the processor also:
implements the coarse algorithm and determines the approximate DOA of the source signal of the input signal, wherein the coarse algorithm uses both a coarse spatial grid and the input data received from the input signal to determine the approximate DOA of the source signal.

3. The device of claim 1, wherein the processor estimates the estimation error based on a Taylor series approximation.

4. The device of claim 3, wherein the Taylor series approximation is a first order Taylor series approximation.

5. The device of claim 2, wherein the processor transfers the input data to the Fourier domain before performing a localization task to determine the detailed location of the source signal.

6. The device of claim 2, wherein the coarse spatial grid has a first grid size and the refined spatial grid has a second grid size, and wherein the first grid size differs from the second grid size.

7. The device of claim 2, wherein the coarse spatial grid has a first grid size and the refined spatial grid has a second grid size, and wherein the first grid size is larger than the second grid size.

8. The device of claim 1, wherein the detailed location of the source signal includes the DOA of the source signal.

9. The device of claim 1, wherein the processor also:
outputs the detailed location of the source signal in a displayable format, wherein the displayable format comprises a 3-dimensional representation of the detailed location of the source signal on an optical display.

10. The device of claim 1, wherein the source signal is associated with at least one of a group consisting of: a location of audio noise and a location of an electromagnetic signal.

11. The device of claim 2, further comprising:
one or more input ports that receive the sensor measurements.

12. A computer-implemented method, comprising:
implementing, by a system operatively coupled to a processor, a coarse algorithm comprising a beam-forming algorithm that determines an approximate location of a source signal;
after the implementing the coarse algorithm, estimating, by the system, an estimation error of the coarse algorithm, wherein the estimation error and an approximate direction of arrival (DOA) of the source signal are employed to determine a spatial interval range, and wherein the estimation error is a function of a steering vector and a covariance matrix from sensor measurements associated with the source signal; and
determining, by the system, based on the spatial interval range, input data and a refined spatial grid, a detailed location of the source signal based on a de-convolution approach for a mapping of an acoustic sources algorithm or CLEAN algorithm, wherein the coarse algorithm is performed first, the estimation of estimation error is performed after the coarse algorithm and wherein the determination of the detailed location of the source signal is performed after the estimation of the estimation error.

13. The computer-implemented method of claim 12, further comprising:
determining, by the system, the approximate DOA of the source signal of the input signal, wherein the coarse algorithm uses both a coarse spatial grid and input data received from the input signal to determine the approximate DOA of the source signal.

14. The computer-implemented method of claim 12, wherein the estimation error is based on a Taylor series approximation.

15. A computer program product facilitating determining a location of a signal source, the computer program product comprising a non-transitory computer readable storage medium having program instructions embodied therewith, the program instructions are executable by a processor to:
implement, by the processor, a coarse algorithm comprising a beam-forming algorithm that determines an approximate location of a source signal;
after the implementing the course algorithm, estimate, by the processor, an estimation error of a coarse algorithm comprising a beam-forming algorithm that determines an approximate location of a source signal, wherein the estimation error and an approximate direction of arrival (DOA) are employed to determine a spatial interval range; and
determining, by the system, based on the spatial interval range, input data and a refined spatial grid, a detailed location of the source signal based on a de-convolution approach for a mapping of an acoustic sources algorithm of a CLEAN algorithm.

16. The computer program product of claim 15, wherein the program instructions are further executable by the processor to:
determine, by the processor, the approximate DOA of the source signal of the input signal, wherein the coarse algorithm uses both a coarse spatial grid and input data received from the input signal to determine the approximate DOA of the source signal.

17. The computer program product of claim 15, wherein the estimation error is based on a Taylor series approximation.

18. The computer program product of claim 17, wherein the Taylor series approximation is a first order Taylor series approximation.

* * * * *